US011910279B2

(12) United States Patent
Wu et al.

(10) Patent No.: US 11,910,279 B2
(45) Date of Patent: Feb. 20, 2024

(54) V2X COMMUNICATION WITH SENSOR ASSISTANCE

(71) Applicant: QUALCOMM Incorporated, San Diego, CA (US)

(72) Inventors: Shuanshuan Wu, San Diego, CA (US); Deviprasad Putchala, San Diego, CA (US); Hong Cheng, Bridgewater, NJ (US); Dan Vassilovski, Del Mar, CA (US); Shailesh Patil, San Diego, CA (US); Arzu Karaer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/901,735

(22) Filed: Jun. 15, 2020

(65) Prior Publication Data

US 2021/0152991 A1    May 20, 2021

Related U.S. Application Data

(60) Provisional application No. 62/935,970, filed on Nov. 15, 2019.

(51) Int. Cl.
*H04W 4/40* (2018.01)
*H04W 4/38* (2018.01)
(Continued)

(52) U.S. Cl.
CPC ............. *H04W 4/38* (2018.02); *H04L 1/1819* (2013.01); *H04W 4/12* (2013.01); *H04W 4/40* (2018.02); *H04W 80/12* (2013.01)

(58) Field of Classification Search
CPC ........... H04W 4/40; H04W 4/44; H04W 4/46; H04W 4/023
See application file for complete search history.

(56) References Cited

U.S. PATENT DOCUMENTS

| | | | |
|---|---|---|---|
| 2019/0272760 A1* | 9/2019 | McQuillen | G08G 1/0968 |
| 2020/0286382 A1* | 9/2020 | Avedisov | G08G 1/16 |
| 2021/0022115 A1* | 1/2021 | Miao | H04W 4/46 |

OTHER PUBLICATIONS

Huawei, et al., "On Scenarios and Evaluation Method of eV2X," 3GPP Draft, 3GPP TSG RAN WG1 Meeting #86, R1-166113, 3rd Generation Partnership Project (3GPP), Mobile Competence Centre, 650, Route Des Lucioles, F-06921, Sophia-Antipolis Cedex, France, vol. RAN WG1. No. Gothenburg, Sweden, Aug. 22, 2016-Aug. 26, 2016, Aug. 21, 2016 (Aug. 21, 2016), XP051140068, 5 pages, Retrieved from the Internet: URL: http://www.3gpp.org/ftp/Meetings_3GPP_SYNC/RAN1/Docs/ [retrieved on Aug. 21, 2016] paragraph [2.2.1] p. 5.

(Continued)

*Primary Examiner* — Khalid W Shaheed
(74) *Attorney, Agent, or Firm* — Thien T. Nguyen

(57) ABSTRACT

Techniques described herein provide for enhanced determination of a V2X communication range based on sensor information obtained at a V2X device. According to embodiments, a V2X device can obtain sensor information regarding a detected object and determine a communication range for a V2X message transmitted by the V2X device based on one or more detected properties of the detected object. The V2X message itself may contain information regarding the one or more detected properties of the detected object, as well as information indicative of the location of the V2X device and the determined communication range.

24 Claims, 8 Drawing Sheets

(51) Int. Cl.
      *H04W 80/12*     (2009.01)
      *H04L 1/1812*    (2023.01)
      *H04W 4/12*      (2009.01)

(56) References Cited

OTHER PUBLICATIONS

International Search Report and Written Opinion—PCT/US2020/055242—ISA/EPO—dated Dec. 22, 2020.

Qualcomm Incorporated: "Physical Layer Procedures for HARQ Operation for Groupcast and Unicast Transmissions", 3GPP Draft, 3GPP TSG RAN WG1 Meeting #96, R1-1902995, Physical Layer Procedures for HARQ Operation for Groupcast and Unicast Transmissions, 3rd Generation Partnership Project (3GPP), Mobile Competence Centre, 650, Route Des Lucioles, vol. RAN WG1, No. Athens, Greece, Feb. 25, 2019-Mar. 1, 2019, Feb. 16, 2019 (Feb. 16, 2019), XP051600692, 12 pages, Retrieved from the Internet: URL: http://www.3gpp.org/ftp/tsg%5Fran/WG1%5FRL1/TSGR1%5F96/Docs/R1%2D1902995%2Ezip , [retrieved on Feb. 16, 2019] the whole document.

ZTE: "V2X Message Transmission/reception Using UE Type RSU with LTE-Uu and PC5 One-to-all Broadcast," 3GPP Draft, SA WG2 Meeting #115, S2-162422-V2X Sevices Using UE Type RSU With LTE-Uu and PC5 Discussion, 3rd Generation Partnership Project (3GPP), Mobile Competence Centre, 650, Route Des Lucioles, F-06921, Sophia-Antipolis Cedex, France, vol. SA WG2. No. Nanjing, P.R. China; May 23, 2016-May 27, 2016, May 23, 2016 (May 23, 2016), XP051109183, 10 pages, Retrieved from the Internet: URL: http://www.3gpp.org/ftp/Meetings_3GPP_SYNC/SA2/Docs/ [retrieved on May 23, 2016] pp. 1-3 figures 2.2.2-1.

\* cited by examiner

V2X COMMUNICATION WITH SENSOR ASSISTANCE

RELATED APPLICATIONS

This application claims the benefit of U.S. Provisional Application No. 62/935,970, filed Nov. 15, 2019, entitled "V2X COMMUNICATION WITH SENSOR ASSISTANCE", which is assigned to the assignee hereof, and incorporated by reference herein in its entirety.

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (e.g., road-side units (RSUs), cellular base stations, WiFi access points, servers, etc.), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

To help ensure efficient use of communication, a V2X device is equipped with the ability to apply distance-based communication control to transmitted V2X messages. That is, a V2X device is able to determine a communication range for a V2X message, then transmit the V2X message to all V2X entities within the communication range of the transmitting V2X device. However, the determination of this communication range is currently dictated only by the time required for V2X device to react to a particular maneuver or action. This may be problematic in dynamic circumstances where factors other than reaction time may be important for V2X entities.

BRIEF SUMMARY

Techniques described herein provide for enhanced determination of a V2X communication range based on sensor information obtained at a V2X device. According to embodiments, a V2X device can obtain sensor information regarding a detected object and determine a communication range for a V2X message transmitted by the V2X device based on one or more detected properties of the detected object. The V2X message itself may contain information regarding the one or more detected properties of the detected object, as well as information indicative of the location of the V2X device and the determined communication range.

An example method of sensor-based determination of a communication range for a V2X message, according to this description, comprises obtaining, at the V2X device, sensor information regarding one or more properties of an object detected by one or more sensors, determining the communication range for the V2X message based, at least in part, on the one or more properties of the object, and wirelessly transmitting, from the V2X device, the V2X message. The V2X message comprises information indicative of: a location of the V2X device, and the determined communication range.

An example V2X device, according to this description, comprises a wireless communication interface, a memory, and one or more processing units communicatively coupled with the memory and the wireless communication interface. The one or more processing units are configured to obtain sensor information regarding one or more properties of an object detected by one or more sensors, determine a communication range for a V2X message based, at least in part, on the one or more properties of the object, and wirelessly transmit, via the wireless communication interface, the V2X message. The V2X message comprises information indicative of a location of the V2X device and the determined communication range.

According to this description, another example device comprises means for obtaining sensor information regarding one or more properties of an object detected by one or more sensors, means for determining a communication range for a V2X message based, at least in part, on the one or more properties of the object, and means for wirelessly transmitting the V2X message. The V2X message comprises information indicative of a location of the device and the determined communication range.

An example non-transitory, computer-readable medium, according to this description, has instructions stored thereon which, when executed by one or more processing units, cause the one or more processing units to obtain sensor information regarding one or more properties of an object detected by one or more sensors, determine a communication range for a V2X message based, at least in part, on the one or more properties of the object, and transmit the V2X message. The V2X message comprises information indicative of a location of a V2X device and the determined communication range.

Figure 1:
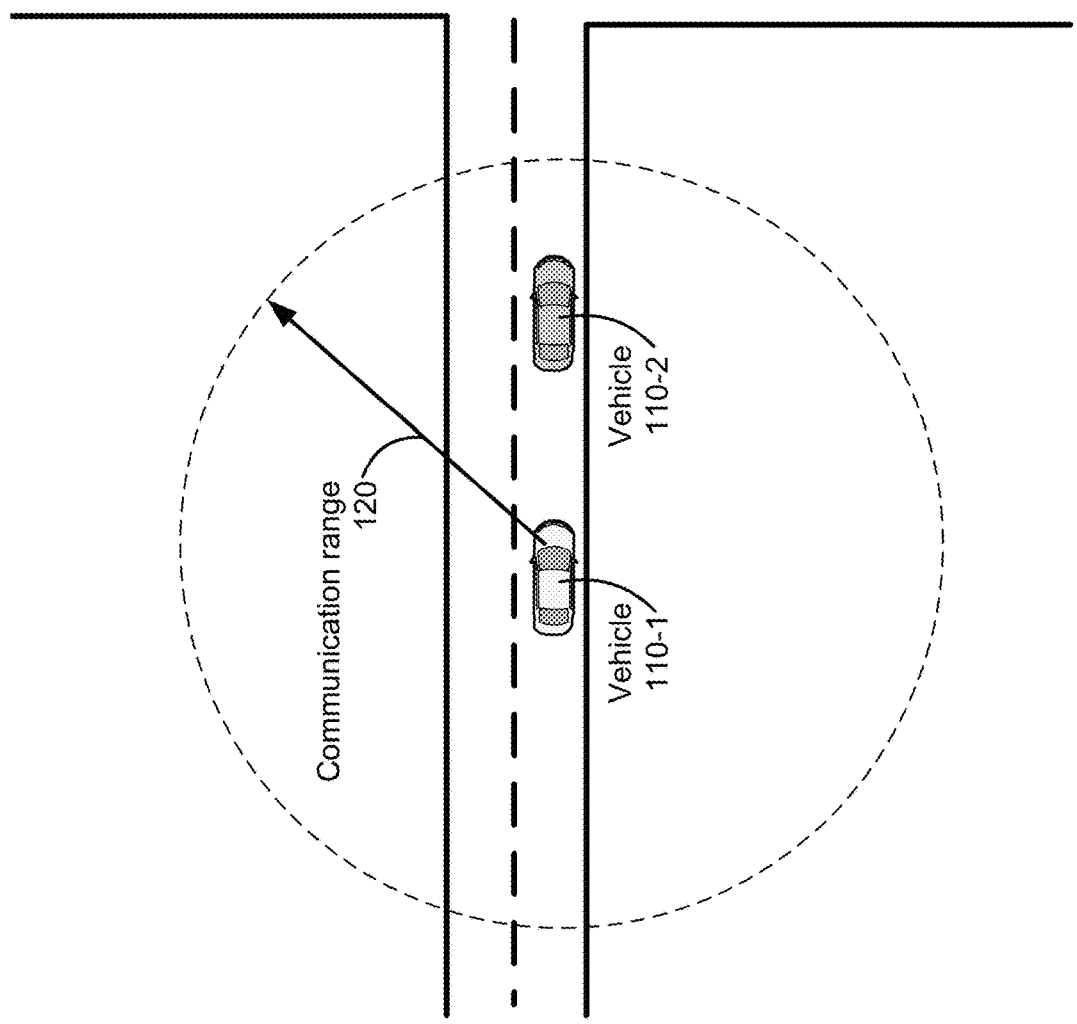
FIG. 1 is a diagram providing an overhead view of a traffic intersection.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As referred to herein, "V2X devices," "V2X vehicles," and "V2X entities" respectively refer to devices, vehicles, and entities capable of transmitting and receiving V2X messages. Similarly, "non-V2X vehicles" and "non-V2X entities" refer to vehicles and entities that do not or cannot engage in V2X communications. Although many embodiments described "V2X vehicles" and "non-V2X vehicles," it will be understood that many embodiments can be expanded to include non-vehicle entities, such as pedestrians, cyclists, road hazards, obstructions, and/or other traffic-related objects etc. As generally referred to herein, the "objects" detected by sensors as described in the embodiments herein may refer to detected vehicles or non-vehicle objects, which may be on or near the road. Additionally, although embodiments herein are directed toward V2X communications, it will be understood that alternative embodiments may be directed toward alternative forms of traffic-related communication. A person of ordinary skill in the art will appreciate such variations.

In V2X communication, data transmitted by one V2X device may be relevant only to V2X devices within a certain distance of the transmitting V2X device. For example, vehicles attempting to traverse an intersection may only find data relevant within a certain proximity to the intersection. Similarly, for vehicles participating in coordinated driving, only vehicles affected by a maneuver may find the data relevant.

As noted, V2X (under 5G NR) supports distanced-based communication control. More specifically, if a receiving V2X device within a specified distance (referred to herein as the "V2X communication range" or simply "communication range") receives a V2X message from a transmitting V2X device, the receiving V2X device will transmit a negative acknowledgement (NAK) if it is within the specified range, but has failed to decode the message. This allows the transmitting V2X device to retransmit the message. Through this mechanism, the reception reliability of V2X is increased for V2X devices within the specified range, enhancing performance for device maneuvers relying on the underlying V2X communication.

Additionally, V2X-capable devices may be knowledgeable of the location and motion state of other V2X vehicles, as well as non-V2X vehicles (and other objects) in their vicinity. For the former, this may be determined by reception of message or signaling from other V2X devices, for example, control signaling indicating V2X device's or vehicle's location, Basic Safety message (BSM) or Cooperative Awareness Message (CAM). For the latter, this may be determined by on-board sensors capable of detecting the motion state and/or other properties of the non-V2X vehicles and other objects.

Embodiments provided herein leverage this ability of a V2X device to use on-board sensors to determine properties of non-V2X vehicles and other objects to dynamically determine a communication range for a V2X message. In some embodiments, for example, a V2X device can determine one or more properties of a detected object and increase the communication range for a V2X message based on the one or more properties, to help inform nearby V2X devices of the one or more properties of the detected object. This additional information can alert nearby V2X devices of any conditions that made need to be taken into account to ensure user safety. Embodiments are described below, in reference to the accompanying figures.

FIG. 1 is a diagram providing an overhead view of a traffic intersection 100, provided to help illustrate how V2X communication can be used by vehicles 110-1, 110-2, 110-3, and 110-4 (collectively and generically referred to herein as vehicles 110) to provide useful information that can be used by vehicles 110 to help ensure the safety of passengers therein. It will be understood that FIG. 1, as with other figures provided herein, is provided as a non-limiting example. As a person of ordinary skill in the art will appreciate, the number of scenarios in which V2X communication can be useful extend far beyond this example. See scenarios can include more or fewer vehicles, different types of vehicles, as well as non-vehicle entities (RSUs, Vulnerable Road Users (VRUs), road hazards and other objects, and the like, which may or may not be capable of V2X communication).

Here, each vehicle 110 is approaching the intersection 100. As vehicles approach the intersection 100, it can be helpful for each vehicle 110 to know the speed, direction, and location of each of the other vehicles, to help ensure safe navigation through the intersection 100. Ultimately, an intersection 100 may manage traversal of vehicles using V2X communication, either with a dedicated RSU, or among the vehicles 110 themselves. However, even without such management, this awareness of the properties of other vehicles 110 can help vehicles (e.g., autonomous and/or semi-autonomous vehicles) and/or their drivers navigate through the intersection 100 safely.

In FIG. 1, the communication range 120 of a V2X message sent from a transmitting vehicle 110-1 is illustrated. (It can be noted, however, that the communication range 120 is illustrated as an example, and not necessarily to scale.) That is, vehicle 110-1 comprises a V2X device capable of transmitting V2X messages (e.g., BSMs, CAMs, etc.) to alert nearby vehicles 110 of properties of the transmitting vehicle 110-1 (location, speed, direction, etc.). As noted, the communication range 120 is generally dictated by time required for a device to react to a desired believer or action. This reaction time is a function of the speed of the transmitting vehicle 110-1, distance to a location (e.g., distance of the transmitting vehicle 110-1 to the intersection 100), and in the case of a coordinated maneuver with other V2X vehicles, inter-vehicle speeds and distances. In some instances, the reaction time may be on the order of a few seconds, although it may be longer or shorter in other instances, depending on the situation. Thus, the communication range 120 dynamically accommodates each situation.

A V2X message sent by the transmitting vehicle 110-1 can include an indication of the communication range 120. For example, the communication range may be carried in the message, or may be indicated by lower layer signaling accompanying the message transmission. As noted, to help ensure messages are successfully communicated, V2X may implement the use of distance based Hybrid Automatic Repeat Request (HARQ) feedback, enabling vehicles 110 within the communication range 120 are able to indicate that they are unable to decode a packet, and prompt retransmission of a V2X message. For example, in FIG. 1, if a receiving vehicle 110-2 comprises a V2X device, is able to decode the indication of the communication range 120 (e.g., control signaling for the V2X message sent from the transmitting vehicle 110-1), but unable to decode the packet of information contained in the V2X message, the receiving vehicle 110-2 can transmit a NAK to prompt the transmitting vehicle 110-1 to retransmit the V2X message. Other vehicles (e.g., vehicles 110-3 and 110-4) outside the communication range 120 that receive the V2X message can choose to ignore the V2X message.

Figure 2:
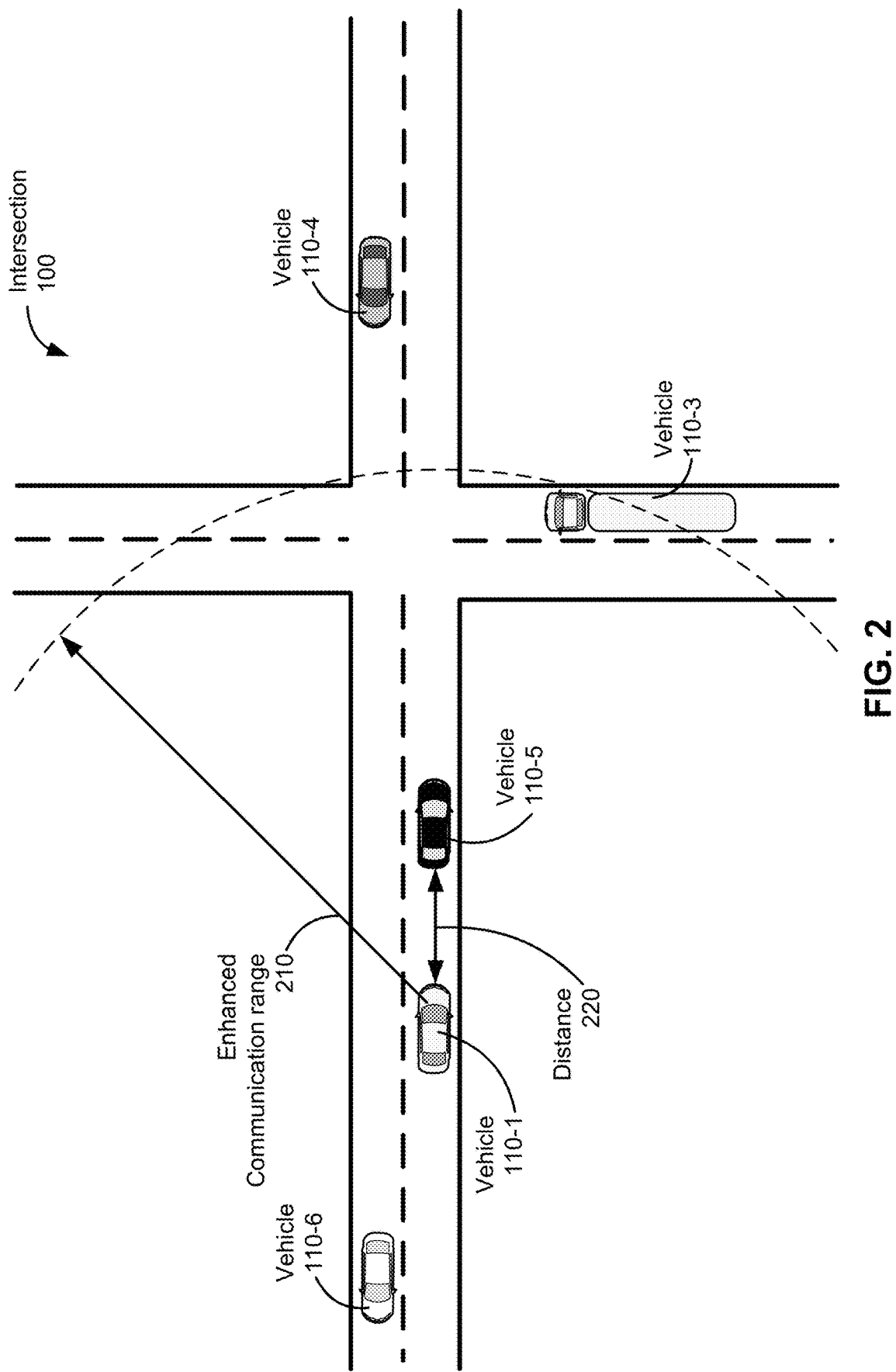
FIG. 2 is a diagram providing an overhead view of an intersection and vehicles, similar to FIG. 1, but further showing how an enhanced communication range may be determined, based on sensor information, according to some embodiments.

FIG. 2 is a diagram providing an overhead view of the intersection 100 and vehicles 110, similar to FIG. 1, but showing how an enhanced communication range 210 may be determined, based on sensor information, according to some embodiments. The enhanced communication range 210 can be determined by the transmitting vehicle 110-1, and can be advantageous in any variety of scenarios, including where the transmitting vehicle 110-1 obtains sensor information regarding one or more properties of a detected object that may be beneficial for nearby V2X devices to be aware of. V2X-capable vehicles generally have access to a large amount of sensor data, and thus, the transmitting vehicle 110-1 may be capable of determining any of a variety of properties of a detected object.

In FIG. 2, the detected object comprises a detected vehicle 110-5. According to some embodiments, the detected vehicle 110-5 may comprise a non-V2X vehicle, or may comprise a V2X device that is currently disabled. In any case, the transmitting vehicle 110-1 may be capable of determining, using sensor data, that the detected vehicle 110-5 is not transmitting V2X messages. This sensor data can be used by the transmitting vehicle 110-1 to determine the enhanced communication range 210.

As a basic example, the transmitting vehicle 110-1 can obtain sensor data regarding one or more properties of the detected vehicle 100-5. Based on the one or more properties (discussed in more detail below), the transmitting vehicle 110-1 can determine a distance for the enhanced communication range 210, enabling a receiving vehicle (e.g., 110-3) to have a larger reaction time to actions by the transmitting vehicle 110-1 (and thus, proper reaction time to 110-5). In some embodiments, not only may the one or more properties of the detected vehicle 110-5 be used by the transmitting vehicle 110-1 to determine the enhanced communication range 210, the transmitting vehicle 110-1 may also transmit these properties in a V2X message to alert other V2X devices of these properties. Thus, in such embodiments, the transmitting vehicle 110-1 can effectively relay V2X-related information of a non-V2X vehicle.

As noted, because the transmitting vehicle 110-1 comprises a V2X device, it may have access to a large amount of sensor data. Sensor data can be obtained from one or more sensors located on the transmitting vehicle 110-1 itself, such as one or more cameras, LIDARs, radars, and the like. That said, sensor data may not necessarily be limited to data from sensors on the transmitting vehicle 110-1.

According to some embodiments, the transmitting vehicle 110-1 may use sensor information received from other V2X devices. For example, the detected vehicle 110-5 may be detected by one or more sensors of another vehicle 110-6, which transmits sensor information (or the detected properties of detected vehicle 110-5 derived therefrom) in one or more V2X messages received by the transmitting vehicle 110-1. The transmitting vehicle 110-1 may then use this information to transmit a new message regarding the detected vehicle 110-5, using the enhanced communication range 210 so that other V2X devices (e.g., vehicle 110-3, if it is V2X capable) can receive information regarding the detected vehicle 110-5. Thus, the transmitting vehicle 110-1 relays information regarding the detected vehicle 110-5 to V2X devices that may not have received the messages sent from the other vehicle 110-6. It can be noted that sensor information may not necessarily be limited to vehicle-mounted sensors. Sensor information may be relayed by non-vehicle V2X devices, such as RSUs, VRUs, and the like.

The properties of the detected vehicle 110-5 are used by the transmitting vehicle 110-1 to determine the enhanced communication range 210 and, as previously indicated, may be included in the V2X message sent from the transmitting vehicle 110-1. These properties may vary, depending on the type of sensors used to detect the detected vehicle 110-5. These properties may generally include information regarding the detected vehicles location and motion state. More specifically, these can include the detected vehicle's absolute and/or relative location (e.g., relative to the transmitting vehicle 110-1, intersection 100, etc.), velocity (or speed and/or direction components separately), acceleration, and the like. In some embodiments, other detected properties may include vehicle type, one or more detected visible features, and the like.

In other situations, the transmitting vehicle 110-1 may determine the enhanced communication range 210 based on sensor information regarding a non-vehicle detected object. These objects can include, for example, VRUs (pedestrians, cyclists, etc.), road hazards, and more. In such instances, similar information may be used to determine the enhanced communication range 210 and/or be included in a V2X message sent from the transmitting vehicle 110-1. Again, this information can include location and motion state of the detected object. In some embodiments, other information, such as object type, can be used as well.

Depending on desired functionality, the transmitting vehicle 110-1 can use the detected one or more properties of the detected vehicle 110-5 to determine the enhanced communication range 210 in any of a variety of ways. In general, the enhanced communication range 210 may begin with an initial communication range based on the location and motion state of the transmitting vehicle 110-1 (e.g., the communication range 120 illustrated in FIG. 1), then increased based on whether the detected one or more properties meet certain conditions.

The location of the detected vehicle 110-5, for example, can be used to determine an enhanced communication range 210 under certain conditions. In some embodiments, the enhanced communication range 210 may simply be determined based on the initial communication range for the transmitting vehicle 110-1, plus the distance 220 between the transmitting vehicle 110-1 and is the detected vehicle 110-5. The location of the detected vehicle 110-5 relative to other objects (other than the transmitting vehicle 110-1) may also be a consideration. As previously noted, for example, an initial communication range 120 may be based in part on the proximity of the transmitting vehicle 110-1 to the intersection (e.g., the communication range 120 may be expanded to help ensure other vehicles (110-3 and 110-4) approaching the intersection receive the V2X message. According to embodiments, the transmitting vehicle 110-1 may take into account the proximity of the detected vehicle 110-5 to the intersection 100 (or construction zone, danger zone, or other traffic feature that may similarly warrant an expanded communication range) when determining the enhanced communication range 210. As such, the transmitting vehicle 110-1 may utilize map and/or other information regarding the location of the intersection 100 (or other traffic feature). Similarly, the transmitting vehicle 110-1 may take into account the proximity of the detected vehicle 110-5 to an RSU, which can then coordinate sensor measurements and/or plan for pedestrian crossing, traffic light changes, etc. for the intersection 100 (or other traffic feature).

In some embodiments, velocity also may be considered in any of a variety of ways, depending on desired functionality. If, for example, the transmitting vehicle 110-1 and the detected vehicle 110-5 are situated as illustrated in FIG. 2 (traveling in the same direction, with the detected vehicle 110-5 in front of the transmitting vehicle 110-1), the speed of the detected vehicle 110-5 may not impact the distance of the enhanced communication range 210, if the detected vehicle 110-5 is traveling at a slower speed than the transmitting vehicle 110-1. On the other hand, if the detected vehicle 110-5 is traveling at a higher speed, the distance of the enhanced communication range 210 may be increased. Here, too, the distance 220 between the vehicles may come into play, such that the relative speed and location of the detected vehicle 110-5 may be taken into account. If the detected vehicle 110-5 is moving in an opposite direction as the transmitting vehicle 110-1 and/or away from the intersection 100 (e.g., located and moving in the manner of vehicle 110-6), then it may not impact the distance of the enhanced communication range 210.

In some embodiments, the direction of movement of the transmitting vehicle 110-1 and/or the detected vehicle 110-5 may be taken into account when determining the enhanced communication range 210. For example, where the transmitting vehicle 110-1 or detected vehicle 110-5 are traveling in a particular direction, the enhanced communication range 210 may be farther in front of the transmitting vehicle 110-1 or detected vehicle 110-5 than behind. Accordingly, the enhanced communication range 210 may not form a circle around the transmitting vehicle 110-1 (e.g., forming an oval shape instead), and/or the transmitting vehicle 110-1 may not be located at the center of the enhanced communication range 210. Moreover, according to some embodiments, the boundaries of this enhanced communication range 210 may also be communicated within the V2X message, and/or beamforming may be conducted to ensure proper communication of the V2X message within the communication range.

Figure 3:
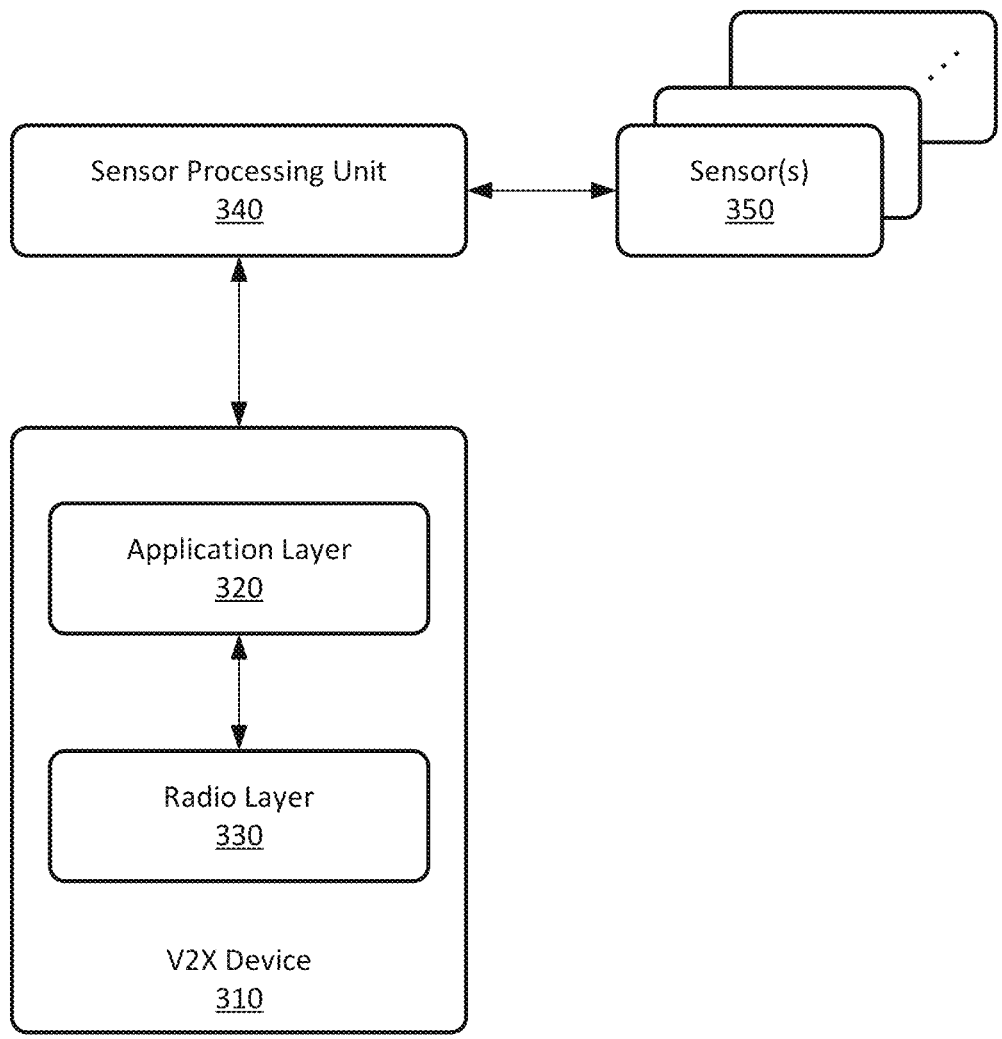
FIG. 3 is a block diagram of a basic architecture of components used to determine the enhanced communication range as described herein, according to an embodiment.

FIG. 3 is a block diagram of a basic architecture of components used to determine the enhanced communication range 210 as described herein, according to an embodiment. These components comprise a V2X device 310 with an application layer 320 and radio layer 330, a sensor processing unit 340, and one or more sensors 350. As a person of ordinary skill in the art will appreciate, the components illustrated in FIG. 3 may comprise hardware and/or software components and may be executed by different devices, as indicated below.

The V2X device 310 may comprise a device or component used to obtain sensor information, determine an enhanced communication range based thereon, and transmit a V2X message having the enhanced communication range. As such, the V2X device 310 may be located on and/or incorporated into a transmitting vehicle (e.g., vehicle 110-1 of FIGS. 1-2, as previously described). That said, some embodiments may not be limited to vehicular V2X devices. And thus, the V2X device 310 may comprise a non-vehicular, V2X-capable device (e.g., at a RSU, VRU, etc.).

The V2X device 310 may comprise hardware and software components, such as those illustrated in FIG. 4 and described below. These components include components capable of executing the application layer 320 and radio layer 330 shown in FIG. 3. For example, the application layer may be implemented by a software application executed by processing unit(s) 410, DSP 420, and/or memory 460 of the V2X device 310, and the radio layer 330 may be implemented by software (e.g., firmware) executed at a wireless communication interface 430 of the V2X device 310.

Although illustrated separate from the V2X device 310, the sensor processing unit 340 and/or sensor(s) 350 may be incorporated into the V2X device 310, according to some embodiments. For example, the sensor(s) 350 may comprise sensor(s) 440 of a V2X device 310, and/or the sensor processing unit 340 may be implemented by the processing unit(s) 410 and/or DSP 420 of the V2X device 310. Again, additional description regarding these and other software and hardware components of a V2X device 310 are subsequently provided, with regard to FIG. 4.

In short, the application layer 320 may be the layer at which the sensor-based communication range (e.g., the enhanced communication range 210 of FIG. 2) may be determined, based on input from the sensor(s) 350 (e.g., comprising a camera, radar, LIDAR, etc.), which is provided via the sensor processing unit 340. The sensor processing unit 340 may comprise a general- or special-purpose processor that acts as a central hub for sensor data by receiving and processing sensor data from the sensor(s) 350. In some embodiments, for example, the sensor processing unit 340 may be capable of receiving and fusing sensor data from the sensor(s) 350 to determine higher-order information. And thus, in some embodiments, the sensor processing unit 340 can provide the application layer 320 of the V2X device 310 with one or more properties of an object detected by the sensor(s) 350 (object type, location, velocity, acceleration, etc.). Additionally or alternatively, raw sensor data may be provided to the V2X device 310, which may make this determination. In some embodiments, therefore, the functionality of the sensor processing unit 340 may be integrated into the V2X device 310, as noted. In some embodiments, as noted, the sensor(s) 350 may be located on and/or integrated into a vehicle or device separate from the V2X device 310. In some embodiments, the sensor processing unit 340, too, can be located on a separate vehicle or device. In such instances, communication between the sensor(s) 350 and sensor processing unit 340, and/or communication between the sensor processing unit 340 and V2X device 310 may be via wireless communication means.

The application layer 320 acts as an intermediary between the radio layer 330 and is the sensor(s) 350. As noted, it can determine, based on sensor data as provided via the sensor processing unit 340, the communication range for a V2X message sent from the V2X device 310 via the radio layer 330. At the radio layer 330, which comprises the physical layer of hardware and software components configured to transmit the V2X message, the determined communication range can be implemented as a Hybrid Automatic Repeat Request (HARQ) feedback distance based on the desired range. As a person of ordinary skill in the art will appreciate, a parameter indicative of the HARQ feedback distance may be included in the V2X message itself; or, the parameter indicative of HARQ feedback distance may be included in signaling accompanying or indicating the V2X message, e.g., sidelink control information. Thus, in some embodiments, the determined communication range may be implemented by including, in the V2X message or corresponding signaling, a parameter indicative of the HARQ feedback distance.

It can be noted, however, that the HARQ feedback distance may not be the same as the determined communication range. In some embodiments, for example, the HARQ feedback distance may be slightly larger than the determined communication range to accommodate some margin. Accordingly, some embodiments may utilize techniques for converting or mapping a determined communication range to a HARQ feedback distance. These can include, increasing the determined communication range by a certain percentage or minimum distance, for example. In another example, the indication of HARQ feedback distance has limitation (e.g., only a limited number of quantized distances can be indicated); the determined communication range is mapped to one of the quantized distances.

According to some embodiments, the radio layer 330 may also be used to determine an appropriate Modulation and Coding Scheme (MCS), based on the communication range determined by the application layer 320 and passed to the radio layer. As a person of ordinary skill in the art will appreciate, the radio layer 330 may use different orders of MCS for transmitting the V2X message. Generally put, more elaborate coding schemes (higher orders of MCS) may be used at shorter ranges, whereas more basic coding schemes are used if the desired ranges longer. Proper MCS selection can be used to help ensure efficient spectrum usage.

Figure 4:
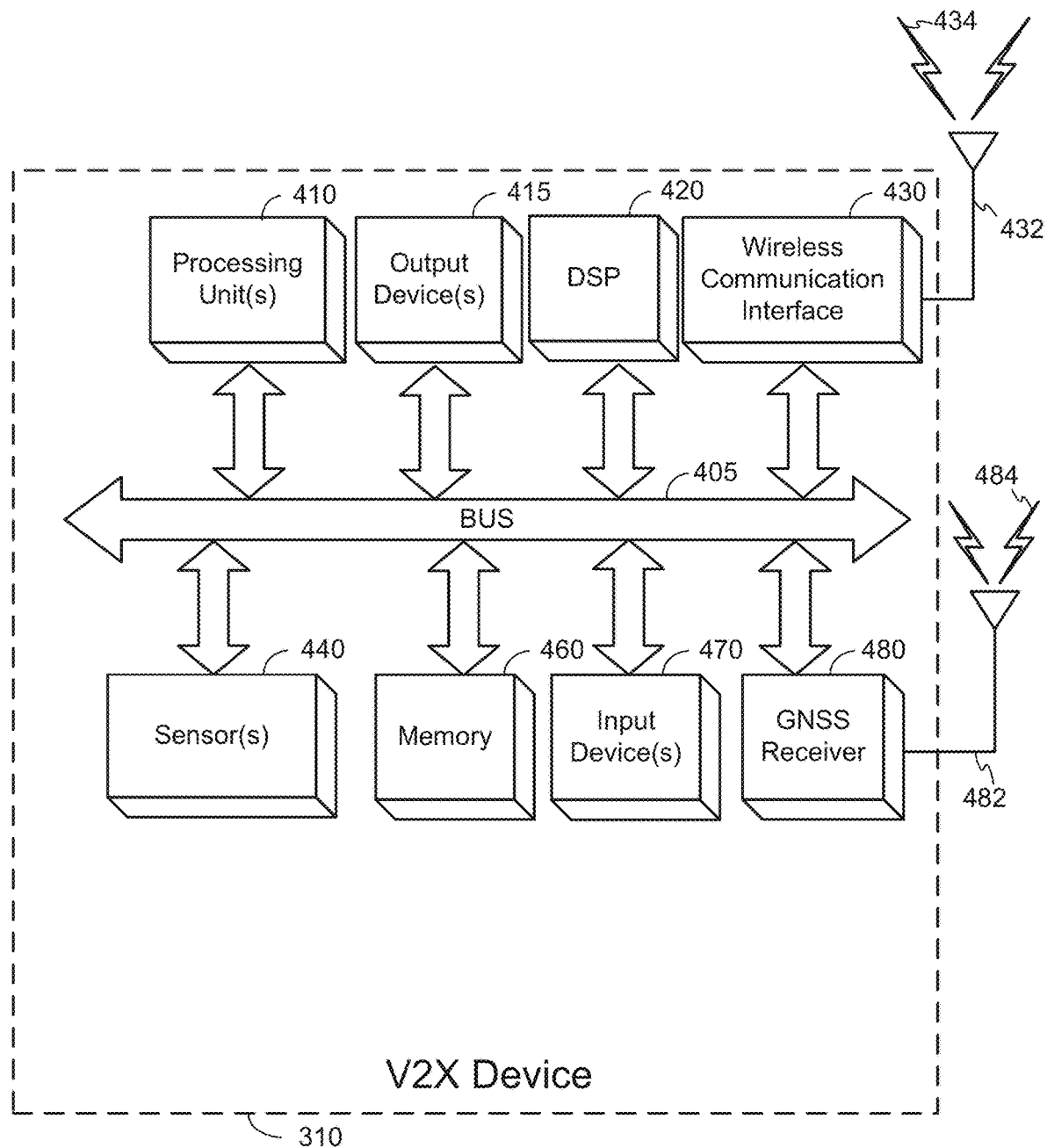
FIG. 4 is a block diagram of an embodiment of a V2X device.

FIG. 4 is a block diagram of an embodiment of a V2X device 310, which may be utilized as described herein above. In some embodiments, the V2X device 310 may comprise or be integrated into a vehicle computer system used to manage one or more systems related to the vehicle's navigation and/or automated driving, as well as communicate with other onboard systems and/or other traffic entities. In some embodiments, the V2X device 310 may comprise a stand-alone device or component on a vehicle (or other V2X entity), which may be communicatively coupled with other components/devices of the vehicle (or entity).

As noted, the V2X device 310 may implement the application layer 320 and radio layer 330 illustrated in FIG. 3, and may also perform one or more of the functions of method 500 of FIG. 5, which is later described. It should be noted that FIG. 4 is meant only to provide a generalized illustration of various components, any or all of which may be utilized as appropriate. It can be noted that, in some instances, components illustrated by FIG. 4 can be localized to a single physical device and/or distributed among various networked devices, which may be located, for example, at different physical locations on a vehicle.

The V2X device 310 is shown comprising hardware elements that can be electrically coupled via a bus 405 (or may otherwise be in communication, as appropriate). The hardware elements may include a processing unit(s) 410 which can include without limitation one or more general-purpose processors, one or more special-purpose processors (such as digital signal processing (DSP) chips, graphics acceleration processors, application-specific integrated circuits (ASICs), and/or the like), and/or other processing structure or means. As shown in FIG. 4, some embodiments may have a separate Digital Signal Processor (DSP) 420, depending on desired functionality. In embodiments where a sensor processing unit 340 (as illustrated in FIG. 3 and previously described) is integrated into the V2X device 310, the processing unit(s) 410 may comprise the sensor processing unit 340.

The V2X device 310 also can include one or more input devices 470, which can include devices related to user interface (e.g., a touch screen, touchpad, microphone, button(s), dial(s), switch(es), and/or the like) and/or devices related to navigation, automated driving, and the like. Similarly, the one or more output devices 415 may be related to interacting with a user (e.g., via a display, light emitting diode(s) (LED(s)), speaker(s), etc.), and/or devices related to navigation, automated driving, and the like.

The V2X device 310 may also include a wireless communication interface 430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. (Examples of such communication are provided in FIG. 6 and described in more detail below.) The wireless communication interface 430 can enable the V2X device 310 to communicate to other V2X devices, and (as previously noted) may be used to implement the radio layer 330 illustrated in FIG. 3 and described above, to transmit a V2X message with a determined communication range. Communication using the wireless communication interface 430 can be carried out via one or more wireless communication antenna(s) 432 that send and/or receive wireless signals 434.

The V2X device 310 can further include sensor(s) 440. Sensors 440 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensors 440 may be used, for example, to determine certain real-time characteristics of the vehicle, such as location, velocity, acceleration, and the like. The sensor(s) 440 illustrated in FIG. 4 may include sensor(s) 350 (as illustrated in FIG. 3 and previously described), in instances where sensor data used to detect an object is received from sensors that are co-located on a vehicle (or other V2X entity) with the V2X device 310.

Embodiments of the V2X device 310 may also include a Global Navigation Satellite System (GNSS) receiver 480 capable of receiving signals 484 from one or more GNSS satellites using an antenna 482 (which could be the same as antenna 432). Positioning based on GNSS signal measurement can be utilized to determine a current location of the V2X device, and may further be used as a basis to determine the location of a detected object. The GNSS receiver 480 can extract a position of the V2X device 310, using conventional techniques, from GNSS satellites of a GNSS system, such as Global Positioning System (GPS) and/or similar satellite systems.

The V2X device 310 may further comprise and/or be in communication with a memory 460. The memory 460 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 460 of the V2X device 310 also can comprise software elements (not shown in FIG. 4), including an operating system, device drivers, executable libraries, and/or other code, such as one or more application programs, which may comprise computer programs provided by various embodiments, and/or may be designed to implement methods and/or configure systems as described herein. Software applications stored in memory 460 and executed by processing unit(s) 410 may be used to implement the application layer 320 illustrated in FIG. 3 and previously described. Moreover, one or more procedures described with respect to the method(s) discussed herein may be implemented as code and/or instructions in memory 460 that are executable by the V2X device 310 (and/or processing unit(s) 410 or DSP 420 within V2X device 310), including the functions illustrated in the method 500 of FIG. 5 described below. In an aspect, then, such code and/or instructions can be used to configure and/or adapt a general-purpose computer (or other device) to perform one or more operations in accordance with the described methods.

Figure 5:
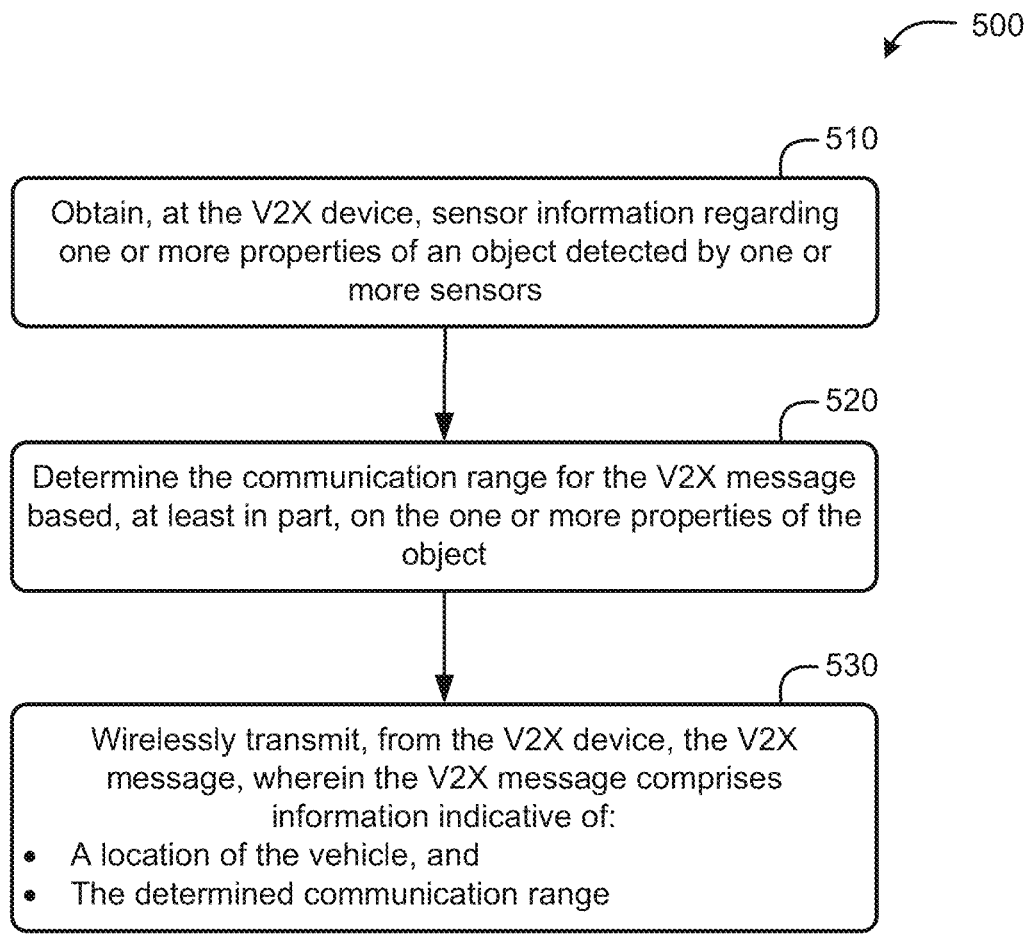
FIG. 5 is a flow diagram of a method at a V2X device of sensor-based determination of a communication range for a V2X message, according to embodiment

FIG. 5 is a flow diagram of a method 500 at a V2X device of sensor-based determination of a communication range for a V2X message, according to embodiment. Alternative embodiments may vary in function by combining, separating, or otherwise varying the functionality described in the blocks illustrated in FIG. 5. Means for performing the functionality of one or more of the blocks illustrated in FIG. 5 may comprise hardware and/or software components of a V2X device, such as the V2X device 310 illustrated in FIG. 4 and described above.

At block 510, the functionality comprises obtaining, at the V2X device, sensor information regarding one or more properties of an object detected by one or more sensors. As indicated in the previously-described embodiments, the object may comprise any traffic-related object whose properties may inform the decisions of nearby V2X devices. This can include, for example, a second vehicle, a road hazard, or a VRU. Further, the one or more properties may include a location of the object, a direction of movement of the object, an acceleration of the object, a velocity of the object, or an object type of the object, or any combination thereof.

Means for performing the functionality at block 510 may include one or more software and/or hardware components of a V2X device, such as a bus 405, processing unit(s) 410, sensor(s) 440, memory 460, wireless communication interface 430, and/or other software and/or hardware components of a V2X device 310 as illustrated in FIG. 3 and previously described.

At block 520, the functionality comprises determining the communication range for the V2X message based, at least in part, on the one or more properties of the object. As described with regard to FIG. 2, for example, location and speed of the detected object, can be used to determine the communication range (an enhanced communication range 210). As further noted, this determination can be made at an application layer 320 of the V2X device 310. And thus, means for performing the functionality at block 520 may include one or more software and/or hardware components of a V2X device, such as a bus 405, processing unit(s) 410, memory 460, and/or other software and/or hardware components of a V2X device 310 as illustrated in FIG. 3 and previously described.

At block 530, the functionality includes wirelessly transmitting, from the V2X device, the V2X message, wherein the V2X message comprises information indicative of a location of the vehicle, and the determined communication range. In some embodiments, the V2X message additionally may comprise the one or more properties of the object. The location of the vehicle and the determined communication range can enable receiving V2X devices to determine, based on their own location, whether they are located within the determined range of the transmitting V2X device. The V2X message may be transmitted by a radio layer of the V2X device (e.g., radio layer 330 of FIG. 3). And as noted, the determined communication range may be reflected in the V2X message or its accompanying signaling as a HARQ feedback distance. Accordingly, in some embodiments, the information indicative of the determined communication range comprises a HARQ feedback distance.

Means for performing the functionality at block 530 may include one or more software and/or hardware components of a V2X device, such as a bus 405, processing unit(s) 410, memory 460, wireless communication interface 430, and/or other software and/or hardware components of a V2X device 310 as illustrated in FIG. 3 and previously described.

Alternative embodiments of the method 500 may include additional or alternative functions, depending on desired functionality. In some embodiments, there may be an initial determination that the detected object is not transmitting V2X messages, thereby allowing the V2X device to transmit the one or more properties of the detected object in its stead. In such instances, the method 500 may further comprise determining the object has not transmitted a V2X message within a threshold period of time (e.g., a window of time in which a V2X message from the object would be expected, if the object were V2X enabled). Further, in such embodiments, obtaining the sensor information regarding the one or more properties of the object may be responsive to determining the object is not transmitted a V2X message within the threshold period of time.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 6:
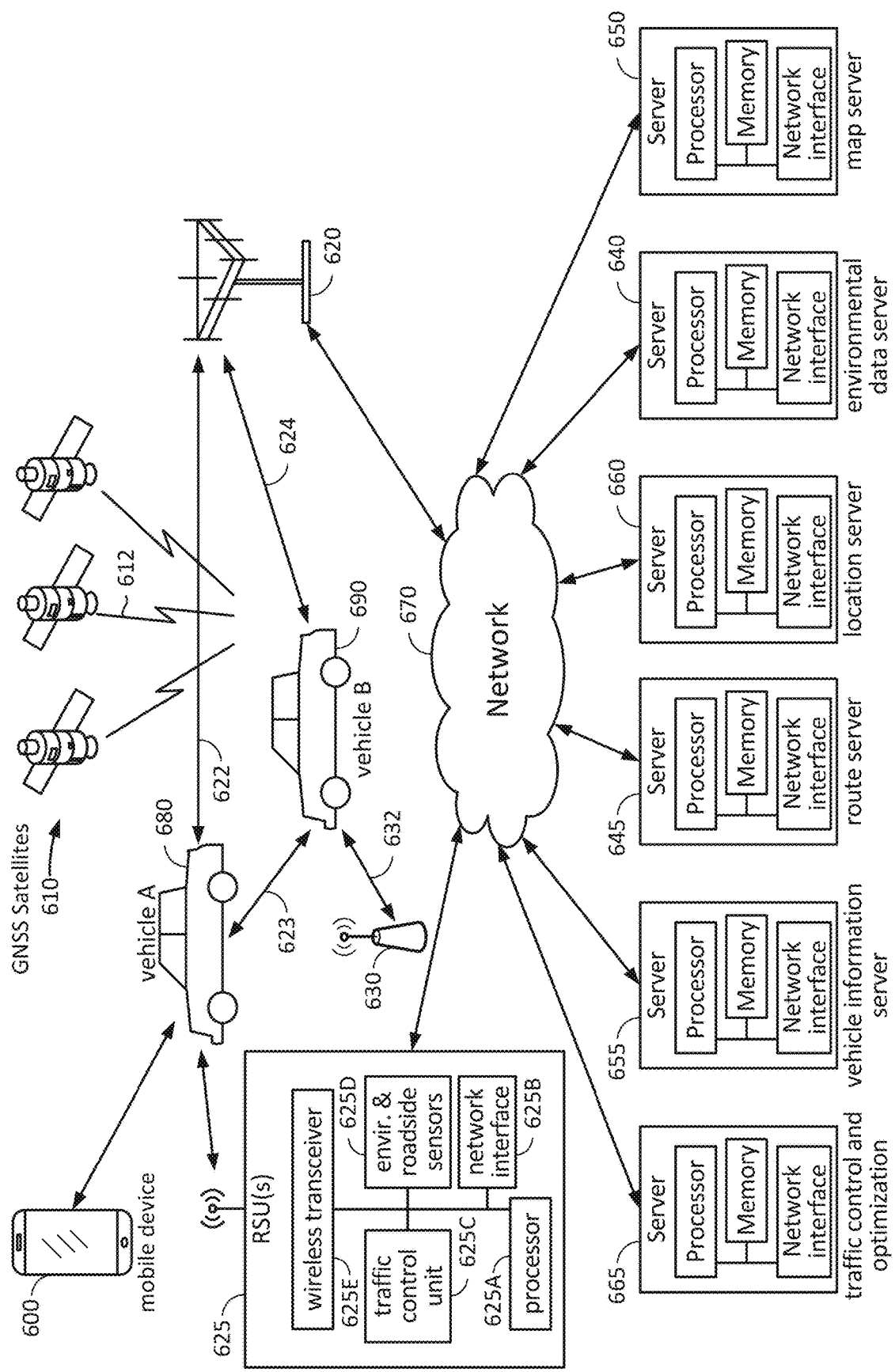
FIG. 6 is an illustration of a system in which vehicles may communicate over various networks and with various devices, vehicles, and servers, according to an embodiment.
Figure 7:
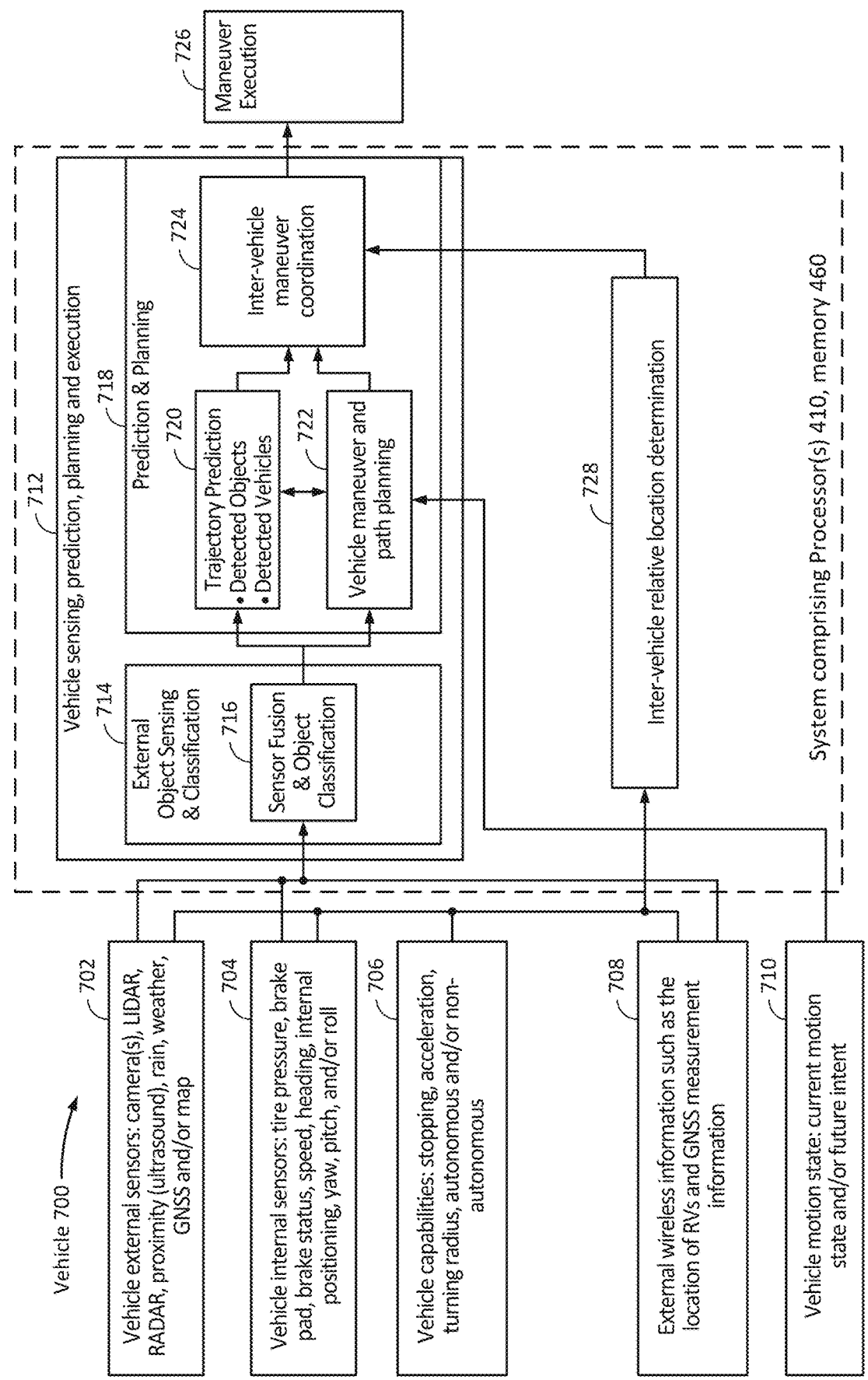
FIG. 7 is a functional block diagram of a vehicle, according to an embodiment.
Figure 8:
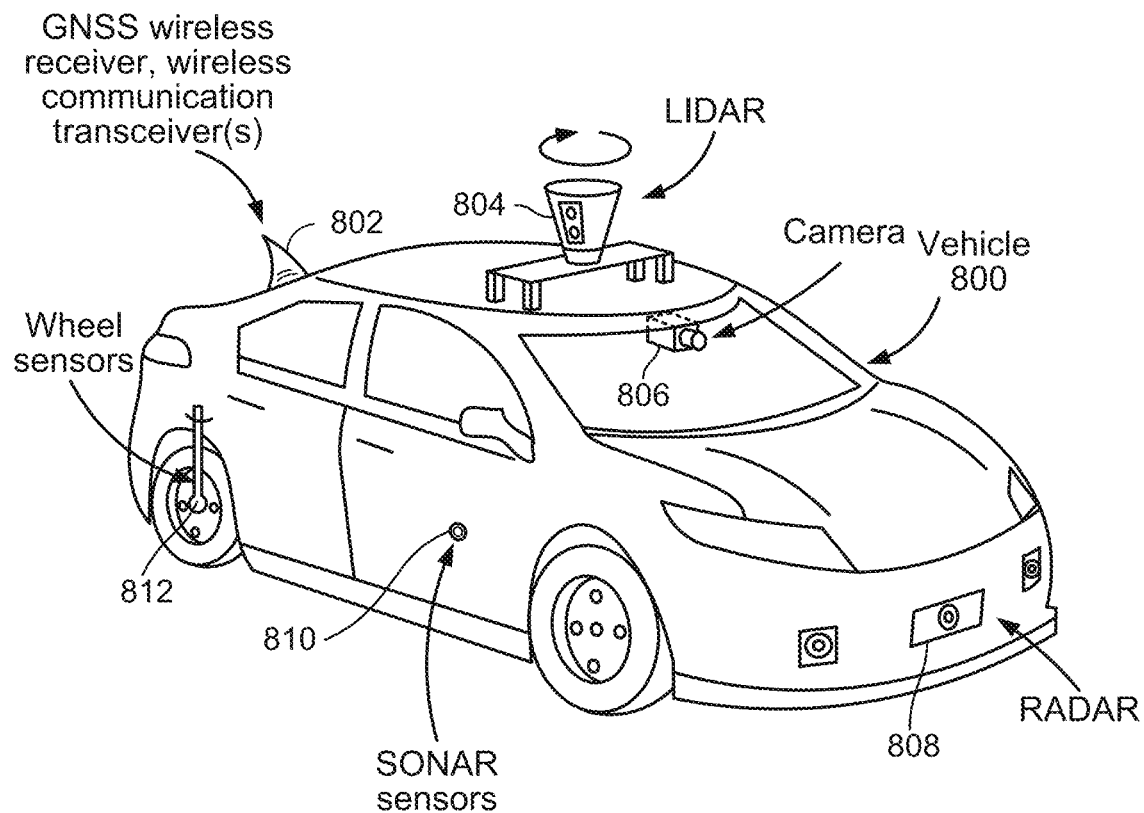
FIG. 8 is a perspective view of an example vehicle, according to an embodiment, capable of communicating using sidelink/CV2X communications in the manner described herein.

FIGS. 6-8 are illustrations of systems, structural devices, vehicle components, and other devices, components, and systems related to V2X communications, which can be used to implement the techniques provided herein for sensor-based determination of a communication range for a V2X message, according to some embodiments.

FIG. 6 is an illustration of a system in which vehicles may communicate over various networks and with various devices, vehicles, and servers, according to an embodiment. In an embodiment, V2X vehicle A 680 may communicate, using V2X or other wireless communication transceiver over link 623, with V2X or otherwise communication-transceiver-enabled vehicle B 690, for example, in an embodiment to perform inter-vehicle relative positioning, negotiation for lane changes or for passage through an intersection, and to exchange V2X data elements such as GNSS measurements, vehicle status, vehicle location and vehicle abilities, measurement data, and/or calculated status, and to exchange other V2X vehicle status steps that may not covered in the V2X capability data elements. In an embodiment, vehicle A 680 may also communicate with vehicle B 690 through a network, for example, via wireless signals 622/624 to/from base station 620 and/or via wireless signals 632 to/from an access point 630, or via one or more communication-enabled RSU(s) 625, any of which may relay communication, information and/or convert protocols for use by other vehicles, such as vehicle B 690, particularly in an embodiment where vehicle B 690 is not capable of communicating directly with vehicle A 680 in a common protocol. In an embodiment, RSU(s) may comprise various types of roadside beacons, traffic and/or vehicular monitors, traffic control devices, and location beacons.

In an embodiment, RSU(s) 625 may have a processor 625A configured to operate wireless transceiver 625E to send and receive wireless messages, for example, a Basic Safety Message (BSM) or Cooperative Awareness Messages (CAM) or other V2X messages to/from vehicle A 680 and/or vehicle B 690, from base station 620 and/or access point 630. For example, wireless transceiver 625E may send and/or receive wireless messages in various protocols such as V2X communication with vehicles (e.g., using sidelink communication), and/or using various Wide Area Network (WAN), Wireless Local Area Network (WLAN), and/or Personal Area Network (PAN) protocols to communicate over a wireless communication network. In an embodiment RSU(s) 625 may contain one or more processors 625A communicatively coupled to wireless transceiver 625E and memory, and may contain instructions and/or hardware to perform as a traffic control unit 625C and/or to provide and/or process environmental and roadside sensor information 625D or to act as a location reference for GNSS relative location between it and vehicles. In an embodiment, RSU(s) 625 may contain a network interface 625B (and/or a wireless transceiver 625E), which, in an embodiment, may communicate with external servers such as traffic optimization server 665, vehicle information server 655, and/or environmental data server 640. In an embodiment, wireless transceiver 625E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 625E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 625 over a wireless link, and claimed subject matter is not limited in this respect.

RSU(s) 625 may receive location, status, GNSS and other sensor measurements, and capability information from vehicle A 680 and/or vehicle B 690 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging. RSU(s) 625 may utilize received information, via wireless transceiver 625E, from vehicle A 680 and/or vehicle B 690, environmental and roadside sensors 625D, and network information and control messages from, for example, traffic control and optimization server 665 to coordinate and direct traffic flow and to provide environmental, vehicular, safety and announcement messages to vehicle A 680 and vehicle B 690.

Processor 625A may be configured to operate a network interface 625B, in an embodiment, which may be connected via a backhaul to network 670, and which may be used, in an embodiment, to communicate and coordinate with various centralized servers such as a centralized traffic control and optimization server 665 that monitors and optimizes the flow of traffic in an area such as within a city or a section of a city or in a region. Network interface 625B may also be utilized for remote access to RSU(s) 625 for crowd sourcing of vehicle data, maintenance of the RSU(s) 625, and/or coordination with other RSU(s) 625 or other uses. RSU(s) 625 may have a processor 625A configured to operate traffic control unit 625C which may be configured to process data received from vehicles such as vehicle A 680 and vehicle B 690 such as location data, stopping distance data, road condition data, identification data and other information related to the status and location of nearby vehicles and environment. RSU(s) 625 may have a processor 625A configured to obtain data from environmental and roadside sensors 625D, which may include temperature, weather, camera, pressure sensors, road sensors (for car detection, for example), accident detection, movement detection, speed detection and other vehicle and environmental monitoring sensors.

In an embodiment, vehicle A 680 may also communicate with mobile device 600 using short range communication and personal networks such as Bluetooth, Wi-Fi or Zigbee or via V2X (e.g., CV2X/sidelink communications) or other vehicle-related communication protocols, for example, in an embodiment to access WAN and/or Wi-Fi networks and/or, in an embodiment, to obtain sensor and/or location measurements from mobile device 600. In an embodiment, vehicle A 680 may communicate with mobile device 600 using WAN related protocols through a WAN network, such as via WAN base station 620 or using Wi-Fi either directly peer to peer or via a Wi-Fi access point. Vehicle A 680 and/or vehicle B 690 may communicate using various communication protocols. In an embodiment, vehicle A 680 and/or vehicle B 690 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A may communicate over WAN networks using WAN protocols via base station 620 or with wireless LAN access point 630 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 680 and/or vehicle B 690, in an embodiment, may contain one or more GNSS receivers such as GNSS receiver 480 for reception of GNSS signals 612, from GNSS satellites 610, for location determination, time acquisition and time maintenance. Various GNSS systems may be supported alone or in combination, using GNSS receiver 480 or other receiver, to receive signals from Beidou, Galileo, GLObal NAvigation Satellite System (GLONASS), and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 625, one or more wireless LAN access point 630 or one or more base stations 620. Various GNSS signals 612 may be utilized in conjunction with car sensors to determine location, velocity, proximity to other vehicles such as between vehicle A 680 and vehicle B 690.

In an embodiment, vehicle A and/or vehicle B may access GNSS measurements and/or locations determined at least in part using GNSS as provided by mobile device 600, which, in an embodiment would also have GNSS, WAN, Wi-Fi and other communications receivers and/or transceivers. In an embodiment, vehicle A 680 and/or vehicle B 690 may access GNSS measurements (such as pseudorange measurements, Doppler measurements and satellite IDs) and/or locations determined at least in part using GNSS as provided by mobile device 600 as a fallback in case GNSS receiver 480 fails or provides less than a threshold level of location accuracy.

Vehicle A 680 and/or Vehicle B 690 may access various servers on the network such as vehicle information server 655, route server 645, location server 660, map server 650, and environmental data server 640.

Vehicle information server 655, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 655 may also provide information in regard to vehicle size, shape, capabilities, identification, ownership, occupancy, and/or determined location point (such as, for example, the location of the GNSS receiver) and the location of the car boundaries relative to the determined location point.

Route server 645, may receive current location and destination information, and provide routing information for the vehicle, map data, alternative route data and/or traffic and street conditions data.

Location server 660, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 650 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 640 may, in an embodiment, provide weather and/or road related information, traffic information, terrain information, and/or road quality & speed information and/or other pertinent environmental data.

In an embodiment, Vehicles 680 and 690 and mobile devices 600, in FIG. 6, may communication over network 670 via various network access points such as wireless LAN access point 630 or wireless WAN base station 620 over network 670. Vehicles 680 and 690 and mobile devices 600 may also, in some embodiments, communicate directly between devices, between vehicles and device to vehicle and vehicle to device using various short range communications mechanisms to communicate directly without going over network 670, such as via Bluetooth, Zigbee and 5G new radio standards.

FIG. 7 comprises a functional block diagram of a vehicle 700, according to an embodiment. As noted, a vehicle 700 may comprise a V2X device 310. Accordingly, example hardware and/or software components for executing the blocks shown in FIG. 7 are illustrated in FIG. 4.

As shown in FIG. 7, vehicle 700 may receive vehicle and environment information from vehicle external sensors 702, vehicle internal sensors 704, vehicle capabilities 706, external wireless information such as the location of other vehicles and GNSS measurement information 708 (from the environment, from other vehicles, from RSU(s), from system servers) and/or from vehicle motion state 710 (describing current and/or future motion states). The received vehicle, sensor, and environment information may, in an embodiment, be processed in one or more processor(s) 410, DSP(s) 420, and memory 460 (shown in FIG. 4), connected and configured to provide external object sensing and classification, prediction and planning, and maneuver execution, as well as to determine and update V2X or other wireless data element values, including GNSS data element values, and to transmit, via a wireless communication interface 430, messaging including the determined data elements. The messaging and data elements may be sent and received via various means, protocols and standards, such as via SAE or European Telecommunications Standards Institute (ETSI) CV2X messages and/or other wireless V2X protocols supported by wireless communication interface 430.

Inter-vehicle relative location determination block 728 may be used to determine relative location of vehicles in an area of interest. In an embodiment, GNSS data is exchanged with vehicles, or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages from other vehicles other devices and location information for vehicle 700 to determine an approximate relative location and/or an approximate range between vehicles.

In an embodiment, other vehicle-related input sources, such as servers 655, 645, 660, 650, and 640, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 724 to determine maneuver execution 726. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 650 may be utilized in conjunction with relative and/or absolute data from neighboring vehicles and/or from RSU(s) 625 to determine high confidence absolute location for a plurality of vehicles and relative location with respect to the road/map. For example, if vehicle A 680 has high accuracy/high confidence location than other vehicles in communication with vehicle A 680, such as vehicle B 690 may use GNSS information for a highly accurate relative location and the highly accurate location from vehicle A 680 sent to vehicle B 690 to determine a highly accurate location for vehicle B 690, even if the systems of vehicle B 690 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 650 is accurate, the ability to propagate highly accurate location data from vehicle A 680 to surrounding vehicles such as vehicle B 690 enables the surrounding vehicles to also accurately determine their relative location versus the map data, even in otherwise troublesome signal/location environments. Vehicle information server 655 may provide vehicle information such as size, shape, and antenna location which may be utilized, for example, by vehicle A or other vehicles to determine not just the relative location between the GNSS receiver on vehicle A 680 and, for example, vehicle B 690, but also the distance between the closest points of Vehicle A 680 and Vehicle B 690. In an embodiment, traffic information from the traffic control and optimization server 665 may be utilized to determine overall path selection and rerouting, used in conjunction with route server 645 (in an embodiment). In an embodiment, environmental data server 640 may provide input on road conditions, black ice, snow, water on the road and other environmental conditions which may also impact the decisions and decision criteria in inter-vehicle maneuver coordination block 724 and maneuver execution block 726. For example, in icy or rainy conditions, the vehicle 700 may execute and/or request increased inter-vehicle distance from adjacent vehicles or may choose route options that avoid road hazard conditions such as black ice and standing water.

Block 728 may be implemented using various dedicated or generalized hardware and software, such as using processor 410 and/or DSP 420 and memory 460 (again, as shown in FIG. 4) or, in an embodiment, in specialized hardware blocks such as dedicated sensor processing and/or vehicle messaging cores. According to some embodiments, the location of nearby vehicles may be determined through various means such as based on signal-based timing measurements such Round-Trip-Time, Time Of Arrival (TOA), signal strength of a broadcast signal for vehicles, and/or a distance determined based upon broadcast latitude and longitude from a neighboring vehicle and the current location of the vehicle. Additionally or alternatively, location of nearby vehicles may be determined from sensor measurements such as LIght Detection And Ranging (LIDAR), RAdio Detection And Ranging (RADAR), SONAR, and camera measurements. In an embodiment, some or all of blocks 702, 704, 706, 708 and/or 710 may have dedicated processing cores, for example, to improve performance and reduce measurement latency. In an embodiment, some or all of blocks 702, 704, 706, 708 and/or 710 may share processing with block 728.

Vehicle external sensors 702 may comprise, in some embodiments, cameras, LIDAR, RADAR, proximity sensors, rain sensors, weather sensors, GNSS receivers 480 and received data used with the sensors such as map data, environmental data, location, route and/or other vehicle information such as may be received from other vehicles, devices and servers such as, in an embodiment, map server 650, route server 645, vehicle information server 655, environmental data server 640, location server 660, and/or from associated devices such as mobile device 600, which may be present in or near to the vehicle such as vehicle A 680. For example, in an embodiment, mobile device 600 may provide an additional source of GNSS measurements, may provide an additional source of motion sensor measurements, or may provide network access as a communication portal to a WAN, Wi-Fi or other network, and as a gateway to various information servers such as servers 640, 645, 650, 655, 660, and/or 665.

It is understood that the vehicle 700 may contain one or a plurality of cameras. In an embodiment, a camera may be front facing, side facing, rear facing or adjustable in view (such as a rotatable camera). As shown in FIG. 8, for example, there may be multiple cameras 806 facing the same plane. For example, the cameras 806 and bumper-mounted camera at 808 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 804 may be roof mounted and rotating or may be focused on a particular point of view (such as front facing, rear facing, side facing). LIDAR 804 may be solid state or mechanical. Proximity sensors may be ultrasonic, RADAR-based, light-based (such as based on infrared range finding), and/or capacitive (surface touch oriented or capacitive detection of metallic bodies). Rain and Weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 704 may comprise wheel sensors 812 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 704 and vehicle external sensors 702 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 728 to determine vehicle location. The car status values derived from measurements from internal and external sensors may be further combined with car status values and/or measurements from other sensor systems using a general or applications processor. For example, blocks 728 and/or 724 or may be implemented on a dedicated or a centralized processor to determine data element values for V2X messaging which may be sent utilizing wireless communication interface 430 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless communication interface 430 and antenna(s) 432.

In an embodiment, vehicle capabilities 706 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive train may share performance estimates for drive-performance related estimates such as breaking/stopping distance, turning radius, and acceleration performance. Vehicle performance estimates may also be obtained, for example, using external V2X input(s) 708, over a wireless network from vehicular data servers on the network. This is particularly helpful to obtain information for vehicles that are not wireless capable and cannot provide vehicular information directly. In an embodiment, vehicle capabilities 706 may also be influenced by car component status such as tire wear, tire brand capabilities, brake pad wear, brake brand and capabilities, and engine status. In an embodiment, vehicle capabilities 706 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 702 and/or vehicle internal sensors 704, may be weighted more heavily and/or given preference in determining capability.

V2X vehicle sensing, prediction, planning execution 712 handles the receipt and processing of information from blocks 702, 704, 706, 708 and 710, via external object sensing and classification block 714, in part utilizing sensor fusion and object classification block 716 to correlate, corroborate and/or combine data from input blocks 702, 704, 706, 708 and 710. Block 714 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 714 may utilize GNSS measurements messages from other vehicles to determine the relative positioning to other vehicles. This output from block 714 may be provided to prediction and planning block 718, which determines detected objects and vehicles and their associated trajectory via block 720 and determines vehicle maneuver and path planning in block 722, the outputs of which are utilized in block 726 vehicle maneuver execution either directly or via V2X inter-vehicle negotiation block 724, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 8 is a perspective view of an example vehicle 800, according to an embodiment, capable of communicating using sidelink/CV2X communications in the manner in the previously-described embodiments. Here, some of the components discussed with regard to FIG. 4 and earlier embodiments are shown. As illustrated and previously discussed, a vehicle 800 can have camera(s) such as rear view mirror-mounted camera 806, front fender-mounted camera (not shown), side mirror-mounted camera (not shown) and a rear camera (not shown, but typically on the trunk, hatch or rear bumper). Vehicle 800 may also have LIDAR 804, for detecting objects and measuring distances to those objects; LIDAR 804 is often roof-mounted, however, if there are multiple LIDAR units 804, they may be oriented around the front, rear and sides of the vehicle. Vehicle 800 may have other various location-related systems such as a GNSS receiver 470 (typically located in the shark fin unit on the rear of the roof, as indicated), various wireless communication interface (such as WAN, WLAN, V2X; typically but not necessarily located in the shark fin) 802, RADAR 808 (typically in the front bumper), and SONAR 810 (typically located on both sides of the vehicle, if present). Various wheel 812 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 8 is intended to provide exemplary locations of various sensors in an embodiment of a vehicle comprising a V2X 400.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, RAM, a programmable ROM (PROM), erasable programmable ROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special-purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method at a vehicle-to-everything (V2X) device of sensor-based determination of a communication range for a V2X message, the method comprising:
   obtaining, at the V2X device, sensor information regarding one or more properties of an object detected by one or more sensors;
   determining the communication range for the V2X message based, at least in part, on the one or more properties of the detected object, wherein the one or more properties of the detected object comprise a direction of movement of the detected object, an acceleration of the detected object, a velocity of the detected object, an object type of the detected object, or any combination thereof; and
   wirelessly transmitting, from the V2X device, the V2X message, wherein the V2X message comprises information indicative of:
   a location of the V2X device, and
   the determined communication range.

2. The method of claim 1, wherein obtaining the sensor information regarding the one or more properties of the object is responsive to determining the object has not transmitted a V2X message within a threshold period of time.

3. A method at a vehicle-to-everything (V2X) device of sensor-based determination of a communication range for a V2X message, the method comprising:
   obtaining, at the V2X device, sensor information regarding one or more properties of an object detected by one or more sensors;
   determining the communication range for the V2X message based, at least in part, on the one or more properties of the object; and wirelessly transmitting, from the V2X device, the V2X message, wherein the V2X message comprises information indicative of:
  a location of the V2X device, and
  the determined communication range;
wherein the information indicative of the determined communication range comprises a Hybrid Automatic Repeat Request (HARQ) feedback distance; and wherein
the communication range is determined by an application layer of the V2X device;
the determined communication range is provided from the application layer to a radio layer of the V2X device; and
the HARQ feedback distance is determined by the radio layer.

4. The method of claim 1, wherein determining the communication range for the V2X message is further based, at least in part, on a direction of travel of the V2X device.

5. The method of claim 1, wherein the object comprises:
a second vehicle,
a road hazard, or
a Vulnerable Road User (VRU).

6. The method of claim 1, wherein the V2X message further comprises information indicative of the one or more properties of the object.

7. The method of claim 1, wherein determining the communication range for the V2X message is further based on one or more properties of the V2X device.

8. A vehicle-to-everything (V2X) device comprising:
a wireless communication interface;
a memory; and
one or more processing units communicatively coupled with the memory and the wireless communication interface, wherein the one or more processing units are configured to:
  obtain sensor information regarding one or more properties of an object detected by one or more sensors;
  determine a communication range for a V2X message based, at least in part, on the one or more properties of the detected object, wherein the one or more properties of the detected object comprise a direction of movement of the detected object, an acceleration of the detected object, a velocity of the detected object, an object type of the detected object, or any combination thereof; and
  wirelessly transmit, via the wireless communication interface, the V2X message, wherein the V2X message comprises information indicative of:
    a location of the V2X device, and
    the determined communication range.

9. The V2X device of claim 8, wherein the one or more processing units are further configured to obtain the sensor information regarding the one or more properties of the object responsive to a determination that the object has not transmitted a V2X message within a threshold period of time.

10. A vehicle-to-everything (V2X) device comprising:
a wireless communication interface;
a memory; and
one or more processing units communicatively coupled with the memory and the wireless communication interface, wherein the one or more processing units are configured to:
  obtain sensor information regarding one or more properties of an object detected by one or more sensors;
  determine a communication range for a V2X message based, at least in part, on the one or more properties of the object; and
  wirelessly transmit, via the wireless communication interface, the V2X message, wherein the V2X message comprises information indicative of:
    a location of the V2X device, and
    the determined communication range;
wherein the one or more processing units are configured to include, in the information indicative of the determined communication range, a Hybrid Automatic Repeat Request (HARQ) feedback distance;
wherein the wireless communication interface is configured to execute a radio layer and the one or more processing units are configured to execute an application layer and wherein:
the communication range is determined by the application layer;
the determined communication range is provided from the application layer to the radio layer; and
the HARQ feedback distance is determined by the radio layer.

11. The V2X device of claim 8, wherein the one or more processing units are configured to determine the communication range for the V2X message further based, at least in part, on a direction of travel of the V2X device.

12. The V2X device of claim 8, wherein, the object comprises:
a second vehicle,
a road hazard, or
a Vulnerable Road User (VRU).

13. The V2X device of claim 8, wherein the one or more processing units are further configured to include, in the V2X message, information indicative of the one or more properties of the object.

14. The V2X device of claim 8, wherein the one or more processing units are configured to determine the communication range for the V2X message further based on one or more properties of the V2X device.

15. A device comprising:
means for obtaining sensor information regarding one or more properties of an object detected by one or more sensors;
means for determining a communication range for a V2X message based, at least in part, on the one or more properties of the detected object, wherein the one or more properties of the detected object comprise a direction of movement of the detected object, an acceleration of the detected object, a velocity of the detected object, an object type of the detected object, or any combination thereof; and
means for wirelessly transmitting the V2X message, wherein the V2X message comprises information indicative of:
  a location of the device, and
  the determined communication range.

16. The device of claim 15, wherein the means for obtaining the sensor information are configured to obtain the sensor information responsive to a determination that the object has not transmitted a V2X message within a threshold period of time.

17. A device comprising:
means for obtaining sensor information regarding one or more properties of an object detected by one or more sensors;
means for determining a communication range for a V2X message based, at least in part, on the one or more properties of the object and proximity of the object to one or more other objects; and means for wirelessly transmitting the V2X message, wherein the V2X message comprises information indicative of:
a location of the device, and
the determined communication range;
wherein the means for wirelessly transmitting the V2X message further comprise means for including, in the information indicative of the determined communication range, a Hybrid Automatic Repeat Request (HARQ) feedback distance;
wherein the device further comprising means for executing a radio layer and an application layer and wherein:
the communication range is determined by the application layer;
the determined communication range is provided from the application layer to the radio layer; and
the HARQ feedback distance is determined by the radio layer.

18. The device of claim 15, wherein the means for determining the communication range for the V2X message comprise means for determining the communication range for the V2X message further based, at least in part, on a direction of travel of the device.

19. The device of claim 15, wherein, the object comprises:
a second vehicle,
a road hazard, or
a Vulnerable Road User (VRU).

20. The device of claim 15, wherein the means for wirelessly transmitting the V2X message further comprise means for including, in the V2X message, information indicative of the one or more properties of the object.

21. The device of claim 15, wherein the means for determining the communication range for the V2X message comprise means for determining the communication range further based on one or more properties of the device.

22. A non-transitory, computer-readable medium having instructions stored thereon which, when executed by one or more processing units, cause the one or more processing units to:
obtain sensor information regarding one or more properties of an object detected by one or more sensors;
determine a communication range for a V2X message based, at least in part, on the one or more properties of the detected object, wherein the one or more properties of the detected object comprise a direction of movement of the detected object, an acceleration of the detected object, a velocity of the detected object, an object type of the detected object, or any combination thereof; and
transmit the V2X message, wherein the V2X message comprises information indicative of:
a location of a V2X device, and
the determined communication range.

23. The non-transitory, computer-readable medium of claim 22, wherein the instructions, when executed by the one or more processing units, further cause the one or more processing units to obtain the sensor information responsive to determining the object has not transmitted a V2X message within a threshold period of time.

24. The non-transitory, computer-readable medium of claim 22, wherein the instructions, when executed by the one or more processing units, further cause the one or more processing units to include, in the information indicative of the determined communication range, a Hybrid Automatic Repeat Request (HARQ) feedback distance.

* * * * *